Figure 4:
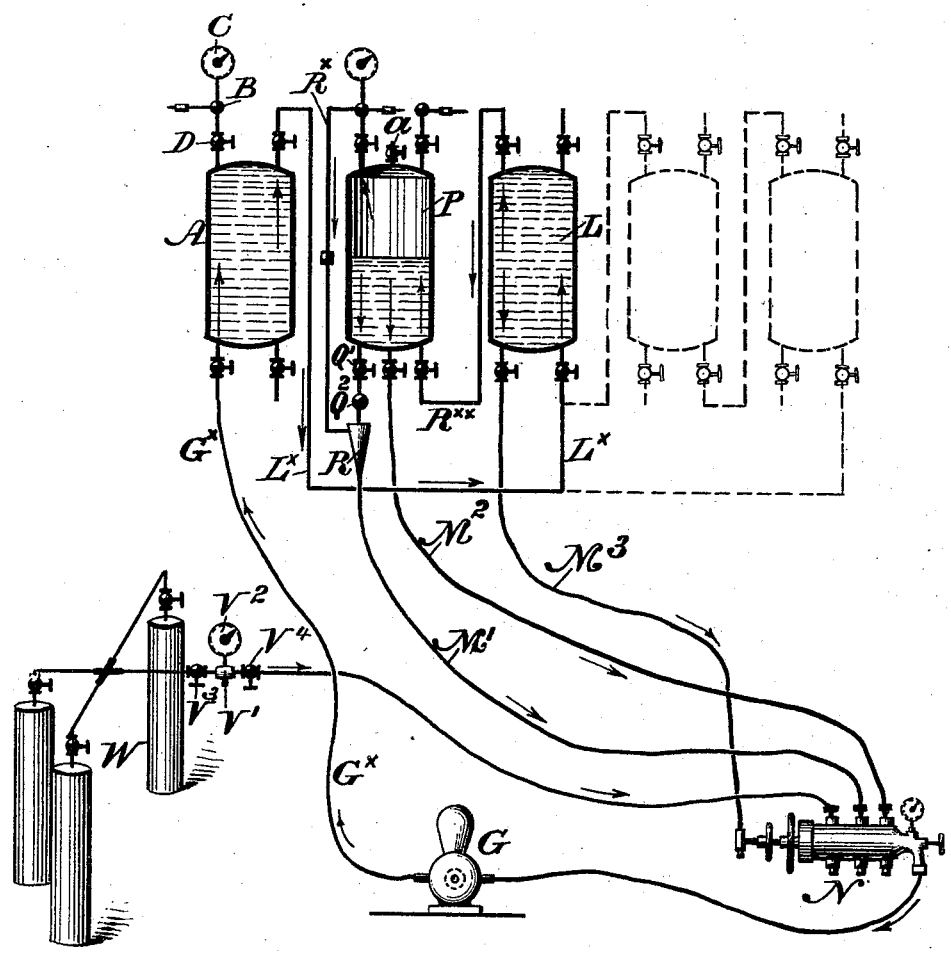

(No Model.) 3 Sheets—Sheet 1.
E. ADAM & M. O. REHFUSS.
METHOD OF AND MEANS FOR CHARGING AND COMBINING FERMENTED
OR UNFERMENTED LIQUIDS WITH CARBONIC ACID GAS.
No. 523,501. Patented July 24, 1894.
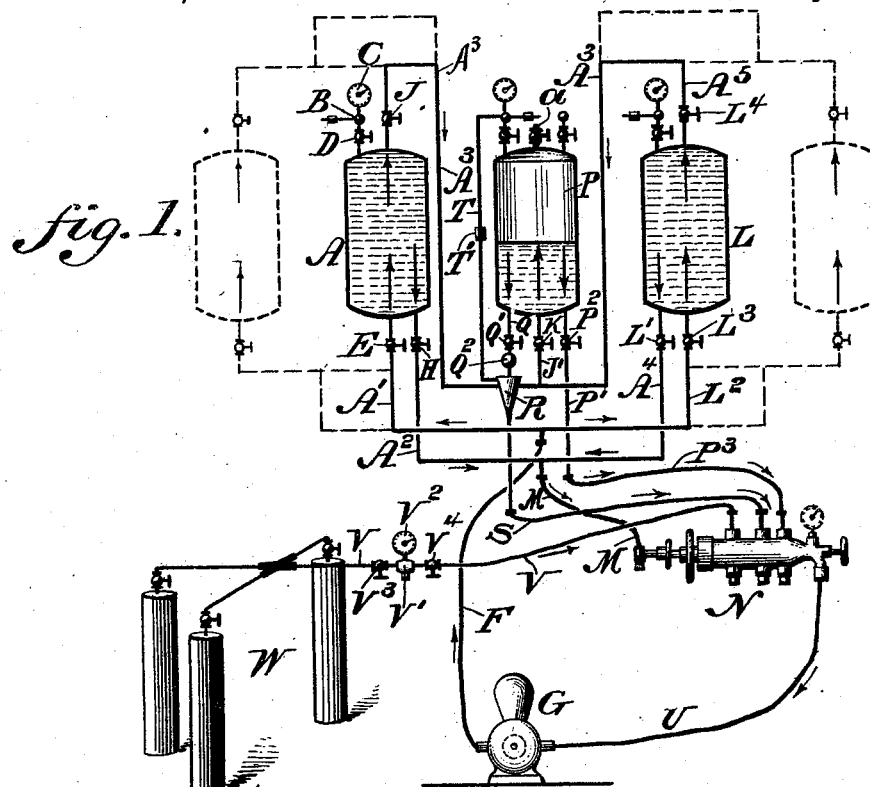
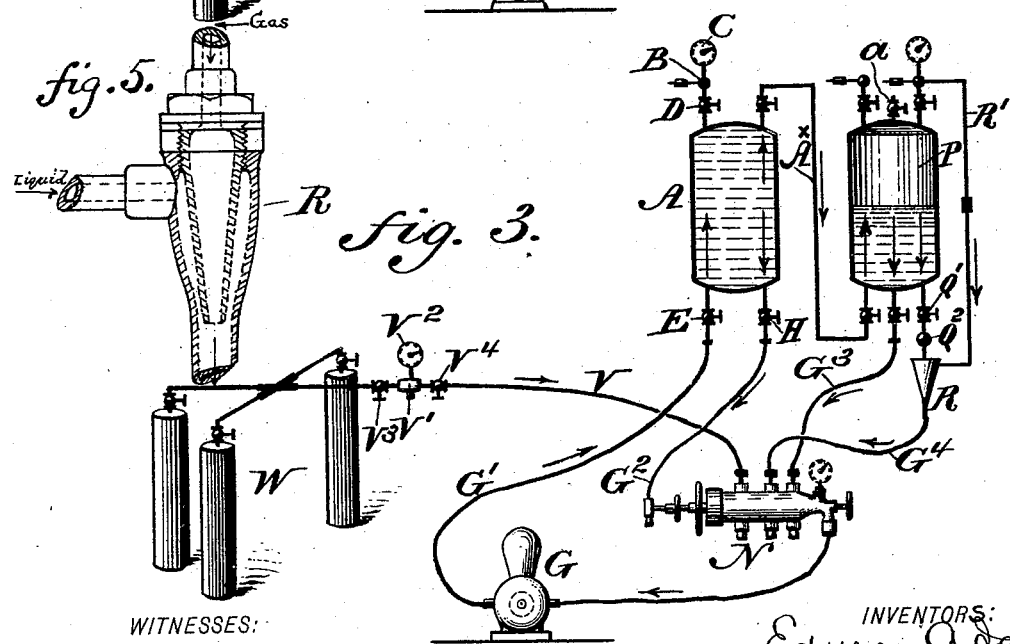
WITNESSES:
L. Donville
C. H. Aagle
INVENTORS:
Edwin Adam
Martin O. Rehfuss
BY
John A. Wiedersheim
ATTORNEY.

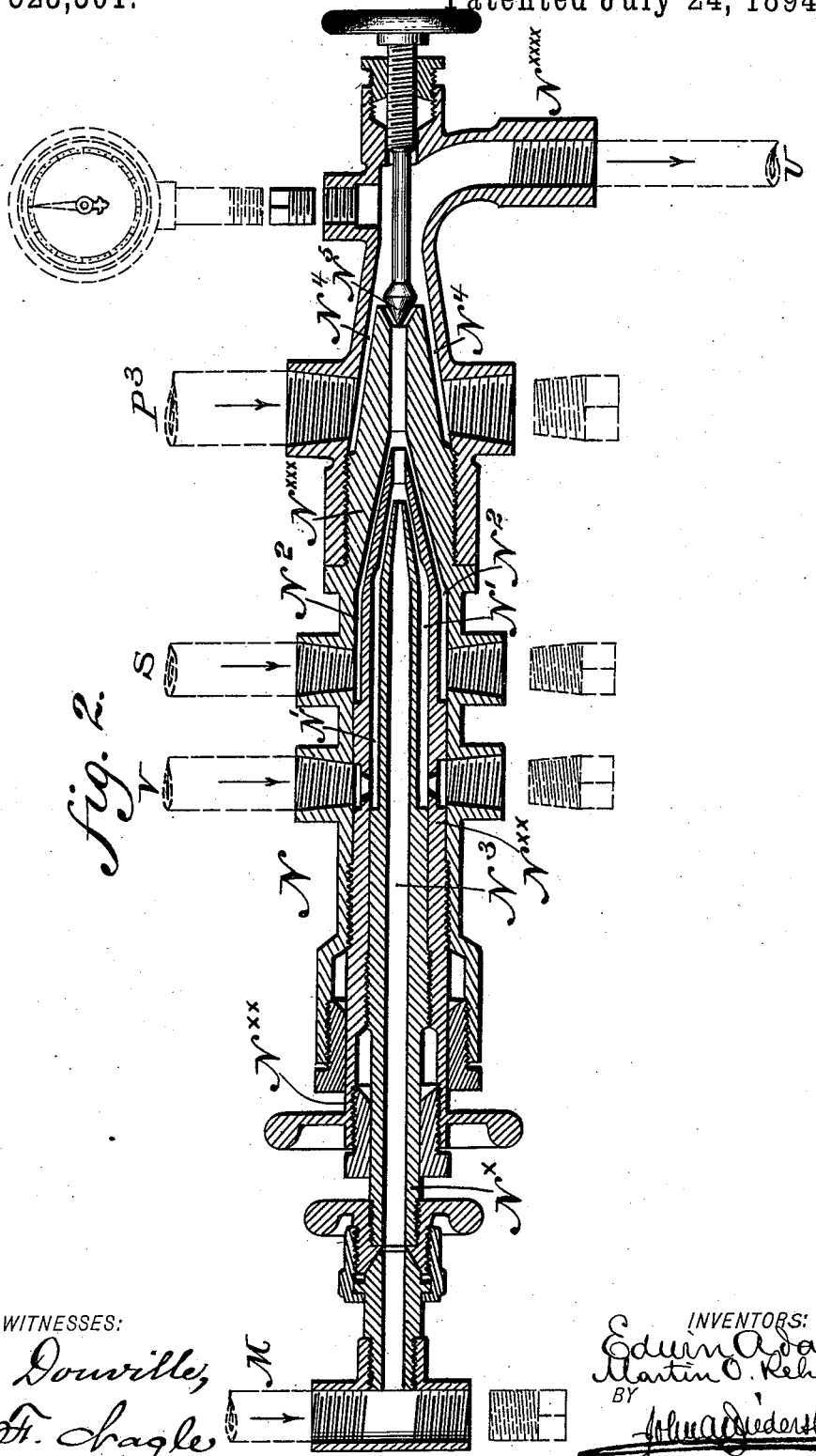

(No Model.) 3 Sheets—Sheet 3.

E. ADAM & M. O. REHFUSS.
METHOD OF AND MEANS FOR CHARGING AND COMBINING FERMENTED
OR UNFERMENTED LIQUIDS WITH CARBONIC ACID GAS.

No. 523,501. Patented July 24, 1894.

WITNESSES:
L. Douville,
P. F. Nagle

INVENTORS:
Edwin Adam
Martin O. Rehfuss
BY John A. Wiedersheim
ATTORNEY.

UNITED STATES PATENT OFFICE.

EDWIN ADAM AND MARTIN O. REHFUSS, OF PHILADELPHIA, PENNSYLVANIA, ASSIGNORS TO EDWIN ADAM, OF SAME PLACE.

METHOD OF AND MEANS FOR CHARGING AND COMBINING FERMENTED OR UNFERMENTED LIQUIDS WITH CARBONIC-ACID GAS.

SPECIFICATION forming part of Letters Patent No. 523,501, dated July 24, 1894.

Application filed December 3, 1892. Serial No. 453,945. (No model.)

*To all whom it may concern:*

Be it known that we, EDWIN ADAM and MARTIN O. REHFUSS, citizens of the United States, both residing in the city and county of Philadelphia, State of Pennsylvania, have invented a new and useful Improvement in Charging Liquids with Carbonic-Acid Gas, which improvement is fully set forth in the following specification and accompanying drawings.

Our invention consists of a novel method or process, and means for charging or fortifying fermented or unfermented liquids or distilled liquids with carbonic acid gas by a hydraulic pressure. To this end we lead a small stream of liquid into a charging device and highly charge the said liquid with carbonic acid gas, also leading into said charging device from a gas supply tank. We then spray or mix the highly charged liquid and gas into a passing stream of liquid which is released of said pressure, said released stream of liquid leading from a partially filled releasing tank into and through said charging device, the whole of the liquid and gas thus charged and mixed being drawn from the charging device by a pump or its equivalent, and is then forced by the same into a compressing vessel filled to its capacity, where the said charged liquid is compressed by or under a hydraulic pressure, thereby thoroughly combining the liquid and gas, at the same time displacing a portion of the liquid under pressure in said vessel, the displaced liquid then leading into the expanding and releasing vessel, where it is released of said pressure as before. This process may then be repeated until the whole of the liquid is sufficiently charged. The said partially filled expanding and releasing vessel having a gas and air space above the liquid for the purpose of receiving the air and the gas which did not combine with the liquid. The gas thus received may then be used for charging or recharging the liquid, and the air, or air and gas may be allowed to escape through a vent valve attached to the said releasing vessel.

Figures 1, 3, and 4 represent partial sections, partial side elevations and partial perspective views of apparatus embodying our invention. Fig. 2 represents a longitudinal section of the charging device of said apparatus on an enlarged scale. Fig. 5 represents a sectional view of an injector employed in our apparatus.

Similar letters of reference indicate corresponding parts in the several figures.

Referring to the drawings: A and L designate compressing and combining vessels which are to be filled with liquid to their utmost capacity, said vessels being provided with safety valves, pressure gages and valves. Connected with the bottom of said vessels A and L, are pipes A' and $L^2$ which are provided with valves E and $L^3$, said pipes A' and $L^2$ being connected by a branch F to the pump G, whereby the liquid is directed into the vessels A and L. Also connected with the bottom of said vessels A and L are pipes $A^2$ and $A^4$, which are provided with valves H and L', said pipes $A^2$ and $A^4$ being connected by a branch M to the charging apparatus N. Connected with the top of the vessels A and L are also pipes $A^3$ and $A^5$, which are provided with valves J and $L^4$, said pipes being connected by a branch J' to the bottom of the expanding and releasing vessel P, which is only partially filled with liquid, said branch J' being also provided with a valve K. Connected with the said vessel P is a pipe P', which is provided with a valve $P^2$, the same being connected with a pipe or hose $P^3$, leading to the charging apparatus N. The vessel P is also provided with a safety valve and pressure gage for evident purposes. Connected with the safety valve of the vessel P is a pipe T, which is provided with a check valve T', and leads to the injector R.

U designates a pipe which is connected with one end of the charging apparatus N, and with the pump G.

V designates a pipe which is connected with the charging apparatus N, and with the carbonic acid gas supply tanks W, said pipe V being provided with a regulating valve V', pressure gage $V^2$, and valves $V^3$, $V^4$.

The charging apparatus consists of a shell having therein the tubular plug $N^×$, forming the chamber $N^3$, the inlet pipe M being connected with said plug, the surrounding plug $N^{××}$ forms the inner chamber N' with which the pipe V is in communication, and the outer chamber $N^2$ with which the pipe S is in communication, and the tubular plug $N^{\times\times\times}$ which communicates with the chambers $N^3, N', N^2$, and has around it the chamber $N^4$, with which the pipe $P^3$ is in communication, the end of said plug forms a seat for the valve $N^5$. The shell has a nozzle $N^{\times\times\times\times}$ with which the discharge pipe U is connected.

The operation is as follows: The compressing vessels A and L are filled with liquid to their fullest capacity, and the releasing or expanding vessel P is filled with liquid to only a partial capacity. All of the valves which are connected with the three vessels are opened, and the pump G is started at a regular speed and operated until the gurgling sound in the vessel P has ceased, said sound having been caused by air passing through the liquid in the vessel P, it coming from air filled spaces in the hose pipes and pump, &c., and is allowed to escape through the vessel P by opening the vent valve $a$ until the air is expelled, when said valve is again closed. We now create a hydraulic pressure in the compressing vessels A and L, by pumping said vessels full of liquid charged with gas, and then continuing to pump liquid into said vessels faster than it is expelled therefrom the valve K being partly closed when the pump slows up somewhat. We then regulate the pump to a speed necessary to increase the hydraulic pressure as desired, or vice-versa. The carbonic acid gas is now turned on, the same passing through the tubing V into the chamber N' of the charging apparatus N, and highly charges a small stream of liquid with said gas, said small stream of liquid being combined of two separate streams forced from the compressing vessels A and L, and passing through the branch tubing M, also into said charging apparatus. This highly charged liquid and gas is then sprayed or mixed into the released and expanded stream of liquid in the chamber $N^4$ of the said charging apparatus, said released and expanded liquid coming from vessel P, and through $P^3$. The whole of the gas charged liquid is then forced by a pump or its equivalent through pipes F, A' and $L^2$ in divided and separate streams into the compressing and combining vessels A and L, where it is subjected to a hydraulic pressure in said vessels, thereby thoroughly combining the liquid and gas. At the same time it displaces a portion of the hydraulic compressed liquid from said vessels A and L, said liquid passing through pipes $A^3$ and $A^5$ into and through branch J' and valve K, and into the expanding and releasing vessel P, when it is released of its hydraulic pressure, allowing the liquid to expand, and relieving it of the carbonic acid gas with which it did not combine, the same rising to the top of the liquid. As the liquid is being constantly charged and constantly streaming in and out of the vessels and the charging apparatus the uncombined carbonic acid gas naturally collects in the vessel P, and the pressure will become greater, it being noticed that the release valve $a$ of the vessel P is set one-half or one-third less than what the hydraulic pressure is. For instance, if such pressure is twelve pounds, then we set said release valve at six pounds, or if the hydraulic pressure is fifteen pounds, we set the valve at five pounds, &c., but it is evident that we can work with a higher and lower pressure if so required. When the pressure is greater, as above stated, then at whatever pressure the valve $a$ is set, it will open the valve $a$ and enter through the pipe or hose T into the injector R, where it enters along with the liquid coming through said injector into the chamber $N^2$ of the charging apparatus. When this occurs, the main supply of gas may be shut off until the pressure in the vessel P is again reduced, then the main supply of gas may be turned on again, when the same process is carried on as before.

The liquid of the vessel P, the gas and the combined streams of compressed liquid of the vessels A and L are kept constantly passing through separate tubes or pipes leading in to the different chambers of the charging apparatus, from whence the combined liquid and gas is pumped and forced in divided and separate streams into the compressing and combining vessels A and L, where it immediately becomes compressed and thoroughly combined under a hydraulic pressure, and it displaces at the same time a portion of the hydraulic compressed liquid from the vessels A and L, and then combines the then displaced liquid into one stream before it enters the vessel P through the valve K. This is repeated until the liquid is sufficiently charged with the gas. We find it advantageous to keep on pumping, and employ the hydraulic pressure up to eighteen pounds, more or less, by increasing the speed of the pump, or regulating the valve K, by which the liquid becomes combined more quickly and better. Should it be necessary to store the liquid, then we confine the same under a pressure from ten to fifteen pounds, more or less, excepting however, the liquid in the vessel P, which has no hydraulic pressure, but has a gas pressure of about six pounds this being cut-off from the vessels A and L by the valve K.

It is evident that the number of vessels may be increased, as shown in dotted lines Fig. 1, or reduced, as in Fig. 3.

In Fig. 4, we show three vessels, and an increased number thereof in dotted lines, but the pipes, tubes and hose are somewhat differently arranged.

In Fig. 3, the pipe G' leading from the pump G is connected with the vessel A, and the pipe $G^2$ leads from said vessel directly to the charging apparatus. The pipes $G^3$ and $G^4$ lead from the vessel P to said charging apparatus. A pipe R' leads from the vessel P to the injector R, and a pipe $A^\times$ leads from the vessel A to the vessel P.

In Fig. 4, pipes N', N², and N³ lead to the charging apparatus respectively from the vessels A, P, and L. A pipe G˟ leads from the pump to the vessel A, and a pipe L˟ is connected with the vessels A and L. A pipe R˟ leads from the top of the vessel P to the injector R, and a pipe R˟˟ leads from the bottom of the vessel P to the top of the vessel L, but the operations are substantially the same in the different figures, and the result is similar in each case.

We expand and release the liquid of its hydraulic pressure because the released and expanded liquid may be charged with carbonic acid gas more freely than when the same is compressed.

It is evident that we may lead the small stream of liquid which is highly charged with gas from vessel P, instead of vessels A and L, or two or more liquids of different characters may be led into the charging apparatus, which may be highly charged with gas before spraying or mixing into the released stream as specified.

By a hydraulic pressure, we mean a water or other fluid pressure having a resistance either absolute or partial.

In absolute resistance, when the fluid is forced into an entirely closed vessel having an inlet only, a hydraulic pressure immediately occurs in the vessel, if the force of said fluid leading into said vessel is continued after said vessel is filled to its capacity.

In partial resistance, when the fluid is forced into a closed vessel having an inlet and an outlet, then the hydraulic pressure takes place in said vessel only. When the outlet stream of said fluid is smaller than the inlet stream, said hydraulic pressure is raised or lowered by increasing or reducing the outlet of said vessel relatively to the inlet of the same, and by increasing or reducing the speed of the stream of fluid produced by the force medium, viz: a pump or its equivalent.

We preferably employ the latter method. This we only apply to the liquid or fluid which is already charged with carbonic acid gas for the purposes of thoroughly combining the liquid and gas.

Before charging the liquid with the gas, the liquid is released of pressure. The gas is then freely taken up in and between the small molecules of the fluid or liquid when charged with said gas. It is then drawn from the charger and forced by a pump or its equivalent into and through a compressing vessel having and maintaining a desired hydraulic pressure for the purpose of bringing the small molecules of liquid and gas into closer contact with one another, the liquid being thereby compelled to combine with the gas, and is consequently retained thereby.

In all other methods of charging, the ordinary pump pressure is used only for the purpose of forcing the uncharged liquid to and through the charger. In all of such cases the gas is charged directly into the forced stream, which is released immediately after charging, and then conveyed into a vessel until the same shows a certain gas pressure, but the gas is not well taken up, first on account of being charged into the forced stream, and next because the gas that is taken up is not well combined on account of being released of pressure after charging, a large part the gas flowing into the charger naturally escaping from said fluid or liquid.

Having thus described our invention, what we claim as new, and desire to secure by Letters Patent, is—

1. The process of treating fermented or unfermented liquid, consisting in charging or fortifying such liquid with carbonic acid gas, and thoroughly combining the liquid and gas by hydraulic pressure in a closed vessel which is supplied with mixed liquid and gas more rapidly than the same is discharged, substantially as described.

2. A process of charging or fortifying a fermented or unfermented liquid with carbonic acid gas, consisting in charging a small stream of liquid with carbonic acid gas in a charging device, and immediately spraying the said liquid and gas into a stream of liquid passing through said charging device and then leading the whole into the suction end of a pump, substantially as described.

3. In a process of charging a fermented or unfermented liquid with carbonic acid gas, supplying liquid from a partially filled tank, charging the same with carbonic acid gas, then combining the liquid and gas by a hydraulic pressure created in a tank filled to its capacity, substantially as described.

4. In a process of charging or fortifying fermented or unfermented liquids with carbonic acid gas, charging liquid with carbonic acid gas in a charging device, leading the charged liquid from said charging device into the suction end of a pump or its equivalent, and by the same forcing the said charged liquid into a compressing tank for the purpose of combining the charged liquid and gas by a hydraulic pressure, substantially as described.

5. In a process of charging or fortifying a fermented or unfermented liquid with carbonic acid gas, charging the liquid with carbonic acid gas and combining the liquid and gas by a hydraulic pressure by continually forcing charged liquid into charged and hydraulic compressed liquid in motion, substantially as described.

6. In a process of charging or fortifying fermented or unfermented liquid with carbonic acid gas, charging the liquid with carbonic acid gas, combining the liquid and gas by a hydraulic pressure, and releasing the same of said pressure, and subsequently recharging the same with gas, substantially as described.

7. In a process of charging or fortifying fermented or unfermented liquid with carbonic acid gas, charging the liquid with carbonic acid gas, and combining the liquid and gas by a hydraulic pressure, then forcing the hydraulic compressed liquid from one vessel to a second vessel by said pressure, and simultaneously reducing or increasing the pressure on said liquid in the second vessel, substantially as described.

8. In a process of charging or fortifying fermented or unfermented liquid with carbonic acid gas, charging liquid with carbonic acid gas, and combining the liquid and gas in a tank by a hydraulic pressure, then forcing the charged and combined liquid into a releasing tank having a gas and air space, and a vent valve above the liquid, substantially as described.

9. In a process of charging or fortifying a fermented or unfermented liquid with carbonic acid gas, charging liquid with carbonic acid gas, and combining the liquid and gas in a tank by a hydraulic pressure, then forcing the charged and combined liquid into a releasing vessel, and carrying off and utilizing the uncombined and released gas for recharging, substantially as described.

10. In a process of charging or fortifying fermented or unfermented liquid with carbonic acid gas, simultaneously charging the liquid with carbonic acid gas, combining the said liquid and gas by a hydraulic pressure, and displacing the liquid from one vessel to another by said pressure, substantially as described.

11. In a process of charging fermented or unfermented liquids with carbonic acid gas, charging two or more liquids with carbonic acid gas, and spraying the resultant aerated liquid into a separate passing stream of liquid, and combining the whole by a hydraulic pressure, substantially as described.

12. In a process of charging fermented or unfermented liquids with carbonic acid gas, charging two or more streams of the liquid with the gas, uniting the streams, bringing the resultant stream into a vessel, and then combining the liquid and gas by a hydraulic pressure in said vessel, substantially as described.

13. In a process of charging or fortifying a fermented or unfermented liquid with carbonic acid gas, combining separate streams coming from separate vessels, charging the resultant stream with carbonic acid gas, and combining the liquid and gas by a hydraulic pressure, substantially as described.

14. In a process of charging or fortifying a fermented or unfermented liquid with carbonic acid gas, releasing the hydraulic compressed liquid of pressure, charging the same with carbonic acid gas, creating and maintaining a hydraulic pressure on said liquid after charging, substantially as described.

15. The process of charging and treating a malt or other liquid with carbonic acid gas consisting in leading a small stream of liquid into a charging apparatus where it is highly charged with carbonic acid gas, and simultaneously leading a large stream of liquid released of pressure also into said charging apparatus where it is mixed with the highly charged small stream, then subjecting the whole to a pressure, substantially as described.

16. An apparatus having a releasing and expanding vessel, a gas charging device, and a pipe connecting the same with said vessel, a compressing and combining vessel suitably connected to said charging device, and a tank for carbonic acid gas, substantially as described.

17. An apparatus having a releasing and expanding vessel, a gas charging device, and a pipe connecting the same with said vessel, a compressing and combining vessel suitably connected to said charging device, and means for creating a hydraulic pressure in said compressing and combining vessel, substantially as described.

18. An apparatus for the purpose set forth consisting of a releasing vessel, a gas charging device, a pipe connecting said vessel and said device, a compressing and combining vessel, also suitably connected to said device, and an injector for carrying off the uncombined gas after charging, substantially as described.

EDWIN ADAM.
MARTIN O. REHFUSS.

Witnesses:
JOHN A. WIEDERSHEIM,
A. P. JENNINGS.